United States Patent [19]

Cox

[11] Patent Number: 4,462,050
[45] Date of Patent: Jul. 24, 1984

[54] HYBRID DIGITAL-ANALOG SIGNAL RECORDING-PLAYBACK SYSTEM

[76] Inventor: J. Rodney Cox, 8121-3 Lake Ave., Louisville, Ky. 40222

[21] Appl. No.: 356,848

[22] Filed: Mar. 10, 1982

[51] Int. Cl.³ .......................... G11B 5/00; G11B 15/02
[52] U.S. Cl. .......................................... 360/32; 360/22
[58] Field of Search ............................... 360/32, 22, 55

[56] References Cited

U.S. PATENT DOCUMENTS

4,125,865  11/1978  Mohammadio'on ................... 360/32
4,222,072  9/1980  Bailey ..................................... 360/32

Primary Examiner—Vincent P. Canney

[57] ABSTRACT

A hybrid audio frequency recorder employing digital signal processing techniques in the recording and playback sections combined with analog recording on the magnetic recording medium. For recording, the audio frequency signal is sampled and each sample converted to a composite digital word in parallel bit form. The word bits are separated into sub-words, the sub-words then being converted back separately into analog form for recording on separate tracks of the recording tape. On playback, the analog signals are reproduced from the separate tracks of the tape, converted into digital sub-words which are then combined to reconstitute the composite digital word representing the original amplitude of the audio frequency signal sample. Successive ones of the composite words are filtered to produce a faithful reproduction of the original audio frequency signal. In addition to operation with a magnetic recording medium, the system is also useful with other recording media such as video disc, laser recording, and the like, wherever it is desired to improve the signal-to-noise ratio performance of the recording and playback process.

13 Claims, 23 Drawing Figures

HYBRID DIGITAL-ANALOG SIGNAL RECORDING-PLAYBACK SYSTEM

BACKGROUND OF THE INVENTION

The present invention relates to a system for recording and playing back audio signal information using digital signal processing and analog signal recording techniques to provide a high quality, low cost professional studio recorder that is easily adapted to handle any number of input signal channels.

In the recording and playing back of audio frequency signals on systems using magnetic tape and other forms of recording media, the reproduction fidelity of the system is limited somewhat by certain physical properties of the recording media. For example, the dynamic recording range of magnetic tape is limited at the high signal amplitude levels by saturation of the magnetic medium which results in distortion of high level signals. At the low end, the tape signal-to-noise ratio causes low signal amplitudes to become buried in the tape hissing sound. In general, the dynamic range of magnetic tape is limited to about 55 decibels.

In the prior art, systems have been proposed for the purpose of expanding the dynamic range of magnetic recording. In one such system, as exemplified by U.S. Pat. No. 3,346,703, an audio frequency analog signal is segregated into separate channels on the basis of amplitude level and the separate signal channels are recorded on the tape on separate recording tracks at comparable dynamic range levels. During playback, one track typically serves as the main channel for normal sound reproduction until the extreme of its dynamic range is reached, at which time provision is made to switch over to the next channel for reproduction of the signal in that channel thus extending the dynamic range of the system. The difficulty with such arrangements is that switching between channels causes distinct unpleasant sound effects and special provisions must be made to assure a smooth transition in volume level when switching occurs. Moreover, when the auxiliary channel is reverted to, for example, the channel in which high sound levels are carried, the low level signals are effectively lost due to the signal attenuation employed to bring the high amplitude signals within the dynamic range of the tape. The result is a loss of clarity and realism in the sound during loud passages.

Digital signal recording techniques have been developed extensively for the purpose of improving dynamic range and playback fidelity, particularly in high quality professional studio recorders for which the present invention is particularly adapted. In such prior art systems, as exemplified by U.S. Pat. Nos. 4,202,018, 4,211,997 and 4,224,642, the audio signal is converted into digital signal form for recording directly in serial word format onto the magnetic tape. With this arrangement, audio signal amplitude is represented on the magnetic tape by the arithmetic value of the recorded digital signal. The original audio signal is then reconstructed from the digital signals during playback by known digital-to-analog conversion techniques. Systems of this type work quite satisfactorily to improve dynamic range and fidelity over straight analog signal recording systems. However, as the referenced patents suggest, digital recording introduces unique problems not associated with analog recording that require complex and expensive signal processing circuits and recording mechanisms to assure correct processing of the digital signals to achieve the desired results. For example, the loss of a digital bit from any relatively significant bit position can be catastrophic from the standpoint of sound reproduction in terms of errors in amplitude of the reproduced signal. The result is a snapping or popping dound that degrades the quality of the reproduced program material. Moreover, splicing of digitally recorded tapes is not a convenient process since timing can be lost at an incorrectly spliced tape junction with consequent adverse effects on the reproduced sound.

Although magnetic tape is widely used for recording playback systems and particularly for multi-channel studio recorders, other recording media are well known and exhibit similar dynamic range problems especially with respect to signal-to-noise ratio. Examples are magnetic discs, laser beam recording, thermal deformation, video disc, as well as others, and it will be appreciated from the description that follows that the system and method of the present invention is useful with these other media as well as magnetic tape.

It is, therefore, an object of the present invention to provide a record/playback system useful with a variety of recording media which overcomes the aforementioned problems associated with prior art audio record/playback systems.

It is a further object of the invention to provide a record/playback system that does not require complex and expensive mechanisms for digital recording on magnetic tape and other recording media and which is capable of being used with conventional forms of multiple track analog signal recording mechanisms.

It is a further object of the invention to provide a hybrid analog-digital signal recording/playback system which improves the dynamic recording range of the system without the disadvantages associated with pure digital signal recording systems.

It is a still further object of the invention to provide an audio recording/playback system suitable for use with magnetic tape and other recording media that provides improved signal-to-noise ratio performance over prior art systems employing analog signal recording techniques on the recording media.

It is yet another object of the invention to provide a low cost, high quality profession studio recorder system having multiple signal recording channels.

These and other objects and advantages of the invention will be apparent from the detailed description of the invention when taken in connection with the various figures of the drawing.

SUMMARY OF THE INVENTION

In its broadest form, the invention may be described as a hybrid digital-analog recording/playback system in which periodic samples of an amplitude varying audio frequency input signal are converted to digital word format and subdivided into sub-words, which are then converted into separate analog signals for recording, in analog manner, on separate tracks of a dynamic recording medium, such as magnetic tape. For playback purposes, the recorded analog signals are reproduced from the separate tracks of the recording medium, converted to separate digital word format signals and combined into a single digital word format signal corresponding to the digital word signal derived from the input signal. Successive one of these recombined digital word signals are then reconverted into a continuous analog signal, corresponding to the audio frequency input signal, for application to an audio reproducing device, such as a loudspeaker.

More particularly, in one preferred form, the system of the invention comprises a recording section which has an input signal channel for supplying an analog input signal and has means including a first signal sampling circuit, for periodically sampling the amplitude level of the input signal. The recording section also includes first analog-to-digital converting means for converting the amplitude level of each signal sample into a composite digital word having a predetermined number of bits of progressively decreasing arithmetic significance and includes means for separating the bits of the composite word into a plurality of sub-words of progressively decreasing arithmetic significance representative of progressively finer resolution of the amplitude level of the signal sample. The recording section of the invention further includes first digital-to-analog converter circuits for converting the sub-words into analog signal levels in modulated form suitable for analog recording on separate tracks of a recording medium, such as magnetic tape.

The system of the invention also comprises a playback section having means for reproducing the recorded signals from the recording medium and second analog-to-digital converting means for reconverting the amplitude levels of the reproduced signals into sub-words corresponding to the sub-words of the recording section. The playback section then includes means for recombining the reconverted sub-words into a composite digital word corresponding to the composite digital word of the recording section and means including a second digital-to-analog converter circuit for converting successive ones of the recombined composite digital words into a continuous analog signal corresponding to the analog input signal supplied at the input signal channel of the recording section.

In another preferred form of the invention, there is provided a method of recording and playing back audio frequency signals which comprises the steps of supplying an amplitude varying, audio frequency input signal, periodically sampling the amplitude of the input signal and converting the signal sample into a parallel bit digital word, the arithmetic value of which is representative of the amplitude of the signal sample. The method of the invention then includes the steps of segregating the digital word into a plurality of sub-words of progressively decreasing arithmetic significance corresponding to progressively finer resolution of the amplitude level of the signal sample and converting each sub-word into an analog signal level in suitable form for recording in analog form on separeate tracks of a dynamic recording medium. The method of the invention next includes the steps of reproducing the analog signals from the separate tracks of the recording medium, reconverting the separately reproduced analog signals into parallel bit digital sub-words, recombining the reconverted sub-words into a composite digital word and then converting successive ones of the recombined composite words into a continuous analog signal corresponding to the amplitude varying, audio frequency input signal to the recording section.

DETAILED DESCRIPTION

Figure 1:
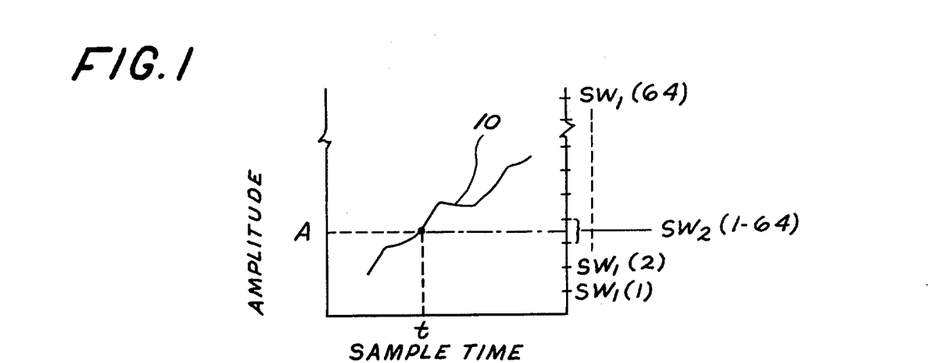
FIG. 1 is a waveform diagram useful in explaining the concepts of the present invention.
Figure 2:
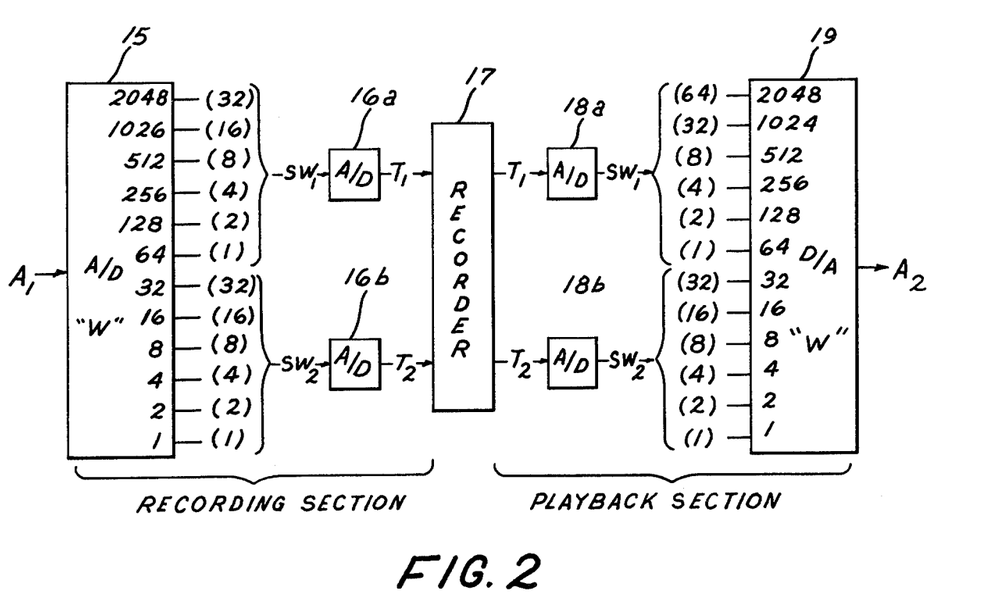
FIG. 2 is a simplified block diagram illustrating the basic concept of the invention.

To aid in understanding the present invention, a general discussion of a simplified version of the invention will be described before considering the details of a specific embodiment. Referring to FIGS. 1 and 2, in the recording section of the hybrid digital-analog recording/playback system of the invention, an analog signal 10 is sampled at time "t" to produce a signal sample $A_1$ of amplitude A which is applied to the input of an analog-to-digital converter 15. Converter 15 operates to convert the amplitude A into a digital word "W" in parallel bit format. In accordance with a feature of the invention, word "W" is divided into a plurality of sub-words $SW_1$ and $SW_2$ which are representative of progressively finer resolution of amplitude A as seen in FIG. 1. The sub-words $SW_1$ and $SW_2$ are then converted by digital-to-analog converters 16a and 16b into analog signal levels which are recorded by conventional record heads on separate tracks $T_1$ and $T_2$ respectively of a signal recorder 17. In the playback section, the analog signals on tracks $T_1$ and $T_2$ are reproduced by suitable read heads and applied to the inputs of analog-to-digital converters 18a and 18b, respectively, where they are converted back into digital sub-word formats $SW_1$ and $SW_2$ corresponding to the sub-words generated in the recording section. Sub-words $SW_1$ and $SW_2$ in the playback section are then recombined into a composite digital word "W" which is converted in digital-to-analog converter 19 into an analog signal $A_2$ corresponding to the input signal applied to analog-to-digital converter 15 in the recording section. Since sampling of signal 10 is done periodically, at some predetermined sampling frequency, the successive outputs of digital-to-analog converter 19 by suitable filtering results in a continuous analog signal corresponding to the original analog signal 10.

Figure 3:
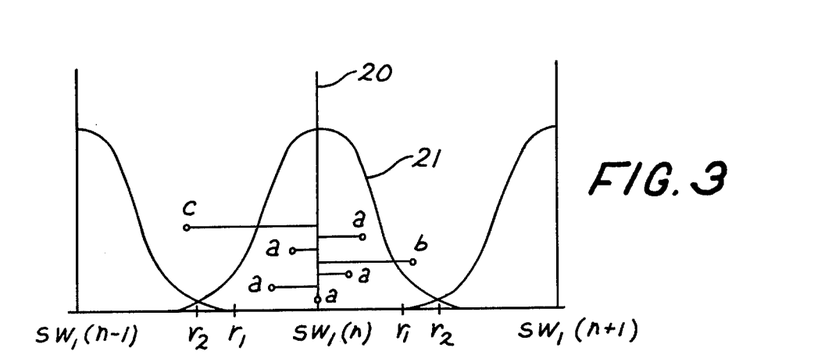
FIG. 3 is a diagramatic illustration useful in explaining the invention.

From this brief description of the basic concept of the invention, two important features will be observed. One is that by segregating or dividing the parallel bit output of word "W" into a plurality of sub-words, in this case two, the dynamic range of amplitude variations of the signal 10 is broken into coarse variations in amplitude level and fine variations, both of which are recorded at comparable amplitude level ranges in the separate tracks $T_1$ and $T_2$ of recorder 17 which can be maintained well within the linear dynamic range of the magnetic recording medium used in recorder 17 with consequent avoidance of signal distortion. Upon playback, the recorded information on all of the recorder tracks is used at all times in reproducing the output signal and consequently no signal information is lost as can happen when switching between tracks is employed as in certain prior art systems. Another important feature is that signal-to-noise ratio performance is improved by virtue of inherent suppression of tape noise or hiss that is achieved from the use of analog-to-digital conversion as part of the signal processing in the playback section. This is best illustrated with reference to FIG. 3. Assume that a signal amplitude represented by sub-word value $SW_1(n)$ has been recorded on Track $T_1$ as represented at vertical line 20 in FIG. 3. Upon reading the signal off of the tape, however, the amplitude may have been modified by the effects of the tape and thus the amplitude may deviate above or below the desired level. As seen in FIG. 3, points a, b, and c represent successive readings of the recorded signal amplitude in which the deviations to the right and left of line 20 represent additions to or subtractions from the true signal level caused by tape noise. Curve 21 represents a probability curve showing the distribution of the signal amplitudes versus the number of times the signal is read from the tape. Since the analog signal from the tape is processed through an analog-to-digital converter, it can be seen from FIG. 3 that in a substantial majority of the time, e.g. for points "a", the true digital value $SW_1(n)$ will result and the deviational effects of tape noise are eliminated. By appropriate selection of the number of bits in the sub-word the capture range of the analog-to-digital (A/D) conversion can be chosen as desired. For example, the use of a 6 bit sub-word may result in a capture range $r_1-r_1$ in which all of points "a" result in conversion to the true amplitude level $SW_1(n)$ while point "b" results in conversion to level $SW_1(n+1)$ and point "c" results in conversion to level $SW_1(n-1)$. By addition of another bit to the sub-word format, the capture range is increased to $r_2-r_2$ thus causing point "b" to be converted correctly to level $SW_1(n)$. However, addition of bits to increase the capture range, i.e. to improve the signal-to-noise ratio, adversely affects the resolution capability of the analog-to-digital conversion process at the input side of the recording section. As a result, a compromise between the two must be made and it is believed at present that a 6-bit sub-word format is a desirable choice for this purpose.

Figure 4:
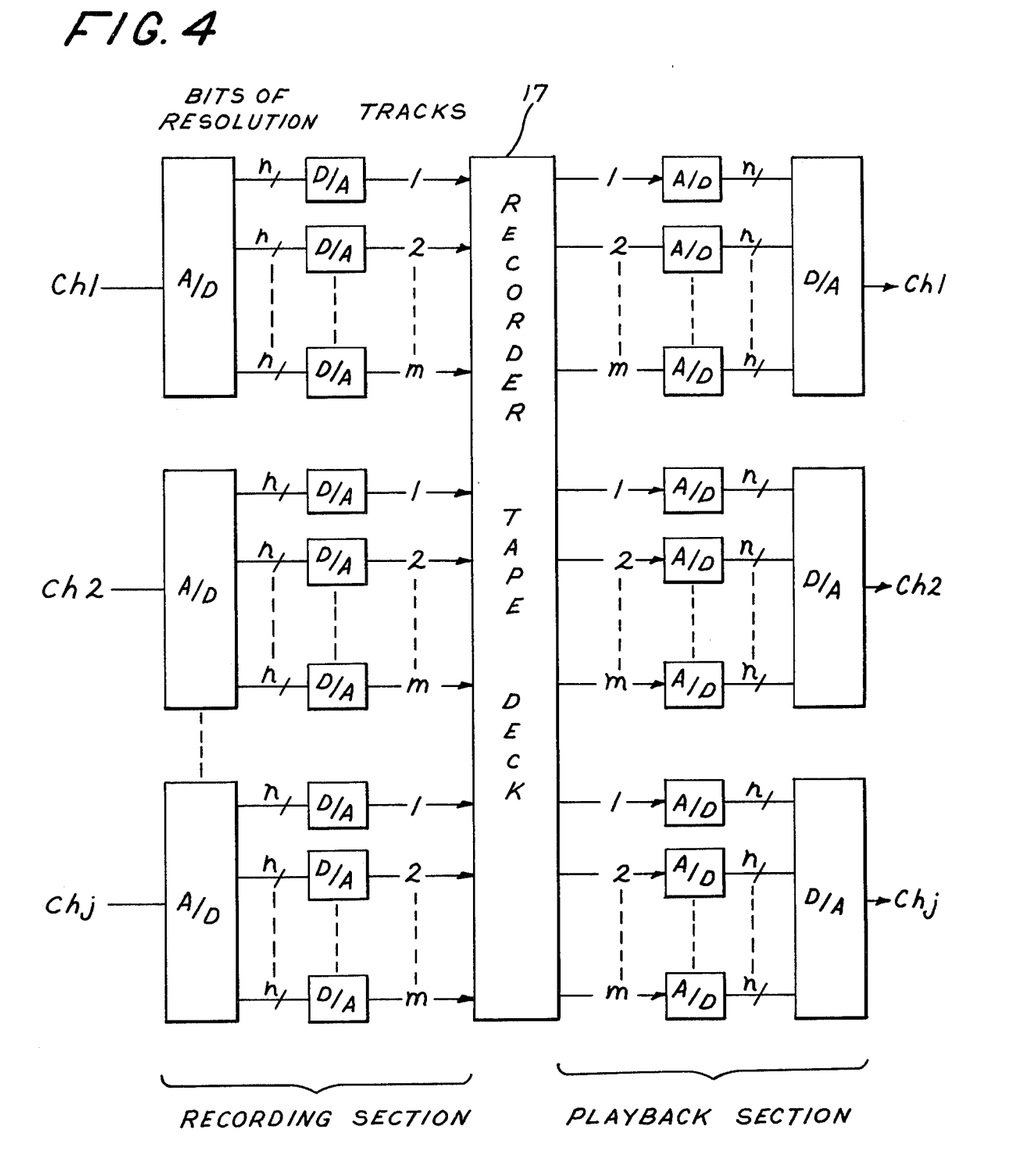
FIG. 4 is a simplified block diagram illustrating an embodiment of the invention in its expanded form.

The basic arrangement illustrated in FIG. 2 corresponds to a single channel system for recording on two tracks of a recorder mechanism. FIG. 4 illustrates how the system may be readily expanded for application in a multi-channel professional studio recorder. As is well known, such recorders, i.e. recording/playback systems, employ as few as eight channels of recording capacity ranging upwards to 16, 32 and 64 channels, depending on the level of recording sophistication desired. The system of the present invention is readily adaptable to such multiple channel systems. Thus any number of channels "j" may be employed with flexibility in the number of bits of resolution "n" per sub-word and the number of recording tracks "m" per channel. It will be appreciated that the number of channels and the number of recording tracks is limited only by the capacity of the recording mechanism 17. It should also be noted that the invention employs an analog recorder mechanism rather than digital and, therefore, any conventional analog recorder mechanism may be used, preferably having a bandwidth of 60 kiloherz for high quality audio recording.

Figure 5:
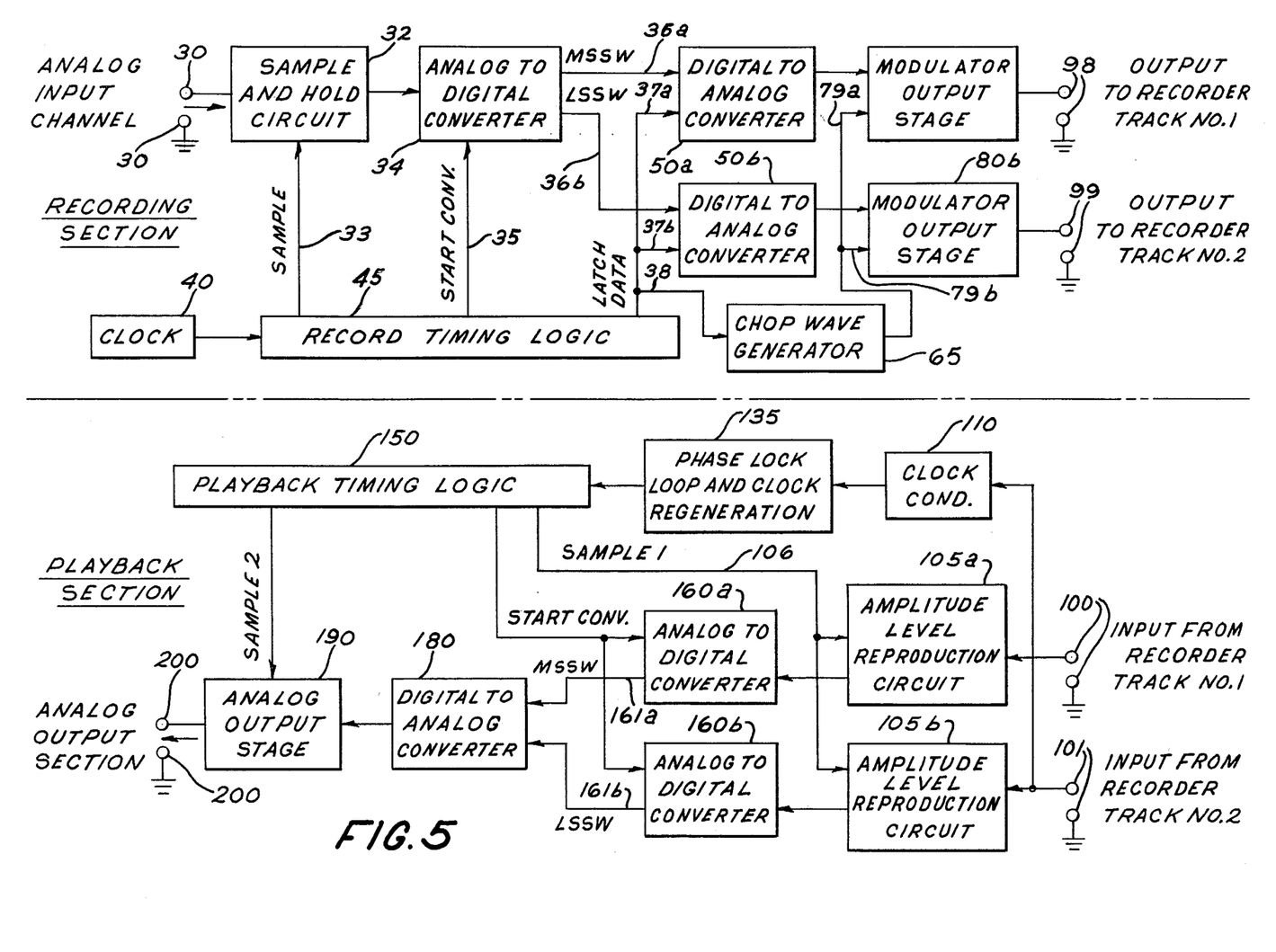
FIG. 5 is a block diagram showing an embodiment of the invention.

In FIG. 5, a hybrid digital-analog signal recording/playback system is shown comprising a recording section in the upper half of the figure and a playback section in the lower half. The recording section is comprised of an input signal channel including input terminals 30 for supplying an analog input signal such as an amplitude varying audio frequency signal typically having a bandwidth up to 20 kiloherz. Means including a first signal sampling circuit 32 is provided for periodically sampling the amplitude level of the input signal and for holding the amplitude long enough to permit conversion to a digital word signal. Timing of the sampling is provided by a sample timing pulse on line 33 furnished from record timing logic circuit 45 as will be described subsequently in more detail. Although not shown, a conventional "anti-aliasing" band pass filter may also be included at the input of sample and hold circuit 32 to suppress higher harmonics of the input signal to avoid spurious signal sampling, all in accordance with known signal sampling technology.

A first analog-to-digital (A/D) converter circuit 34 is provided for converting the amplitude level of each signal sample from sample and hold (S/H) circuit 32 into a composite digital word having a predetermined number of bits. The start of conversion is initiated by a start convert pulse applied on line 35 from logic circuit 45. Means are provided for separating the bits of the composite word into a plurality of sub-words representative of progressively finer resolution of the amplitude level of the signal sample. Diagramatically, this is shown in FIG. 5 by the separation of the bit lines at the output of A/D circuit 34 into two lines 36a and 36b designated MSSW for most significant sub-word, and LSSW, for least significant sub-word, respectively. In this way, the most significant sub-word, corresponding to $SW_1$ in FIG. 2, represents a relatively coarse degree of resolution of the sample amplitude while the least significant sub-word, corresponding to $SW_2$ in FIG. 2, represents a finer degree of resolution of the sample amplitude in between adjacent amplitude levels represented by the most significant sub-word. As previously described in connection with FIG. 4, more than two groups of sub-word bits may be employed, in which case the sub-words below MSSW would represent progressively finer resolution of the signal sample amplitude level.

Means for converting the sub-words MSSW and LSSW into analog signal levels suitable for analog recording on separate tracks of a magnetic recording medium includes first digital-to-analog converter circuits 50a and 50b and also may include modulator output stages 80a and 80b, the outputs of the latter circuit being coupled via output terminals 98 and 99, respectively, to first and second recording tracks of, for example, a magnetic tape recorder mechanism. A latch data timing pulse is applied from logic circuit 45 via lines 37a and 37b to converter circuits 50a and 50b to initiate the digital-to-analog conversion. The latch data timing pulse is also applied via line 38 to a chop wave generator 65, the output of which is applied via lines 79a and 79b to modulator circuits in output stages 80a and 80b to convert the analog output of circuits 50a, 50b into suitable modulated form for recording in the tape recorder. As is customary in digital circuits, a basic timing of the various timing pulses is provided by suitable means such as a crystal controlled clock circuit 40.

In the playback section shown in the lower half of FIG. 5, means for reproducing the recorded signals from the separate tracks of the tape recorder includes input terminals 100, 101 and amplitude level reproducing circuits 105a and 105b. As will be seen in connection with the description of the circuit of FIG. 7, circuits 105a and 105b may each include a sampling circuit to which is furnished a sample timing pulse on line 106 from playback timing logic circuit 150. In order to maintain playback timing pulses in synchronism with the timing pulses of the recording section, it is necessary to provide suitable synchronizing circuits. While it is possible to tie a timing pulse directly from the record section timing logic circuit 45 to playback timing logic circuit 150, it is preferred to use timing information carried through the recording medium to allow for deviation introduced by the recording medium such as may be caused by tape speed variations, tape stretching, etc. For this purpose, the input signal to input terminals 101 is also applied to a clock conditioner circuit 110 and to a phase lock loop and clock regeneration circuit 135.

The playback section also includes means including second analog-to-digital converter circuits 160a and 160b for reconverting the amplitude levels furnished from circuits 105a and 105b into sub-words on lines 161a and 161b corresponding to the sub-words MSSW and LSSW derived in the recording section. A start convert timing pulse is provided on line 162 from timing logic circuit 150. Means including lines 161a and 161b coupled to the inputs of digital-to-analog converter circuit 180 are provided for recombining the reconverted sub-words into a composite digital word corresponding to the composite digital word derived in the recording section. Means including digital-to-analog converter circuit 180 and analog output stage 190 are provided to convert successive ones of the recombined composite digital words into a continuous analog signal corresponding to the analog input signal appearing at the input signal channel of the recording section.

There has thus been described in connection with the general block diagram of FIG. 5, a single channel recording/playback system utilizing two recording tracks on the magnetic recording medium. Additional channels of input signals can be recorded by duplicating the system of FIG. 5 and employing a suitable commercially available analog recording mechanism adapted to handle the additional channels. Correspondingly, the range of input signal levels that can be recorded in any given channel can be increased by increasing the number of bits of the composite word in A/D converter 34 and at the same time separating the composite word into a greater number of sub-words of a desired number of bits per word with a corresponding increase in the number of recording tracks employed. Alternatively, with a given number of recording track increased amplitude resolution capability of the digital processing circuits can be achieved by increasing the number of bits in the composite word and correspondingly increasing the number of bits per sub-word and, indirectly therefore, the number of bits per recording track. As previously explained, however, increase in amplitude resolution in this manner is achieved at the expense of some loss of S/N performance over the same system with fewer bits per sub-word, or track, due to the narrowing of the capture range described in FIG. 3. Consequently, the system designer can determine the desired performance level for both factors and select the digital bit structure that best suits the overall system performance.

Figure 6:
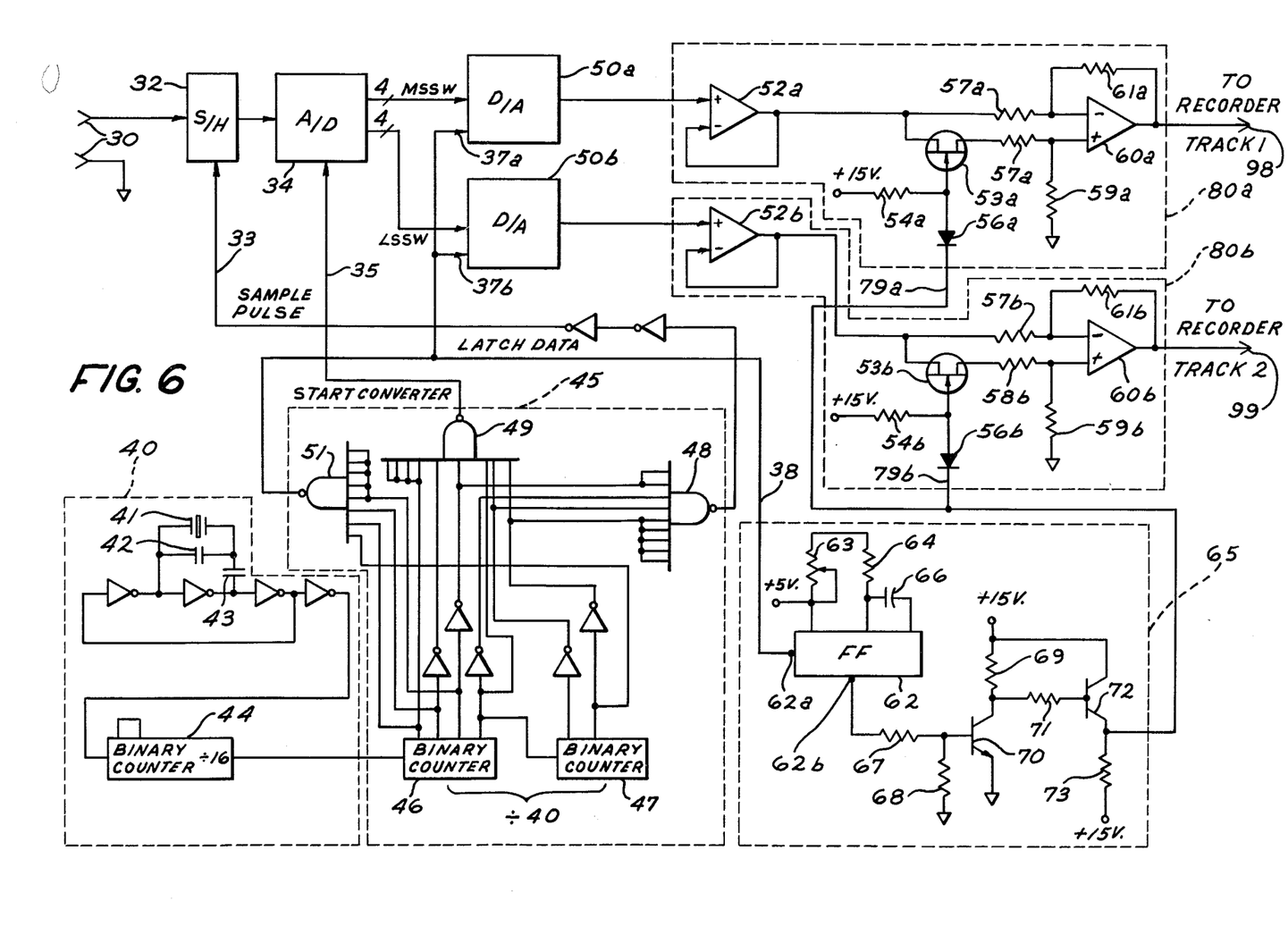
FIGS. 6 and 7 are schematic diagrams of a specific embodiment of the invention.
Figure 7:
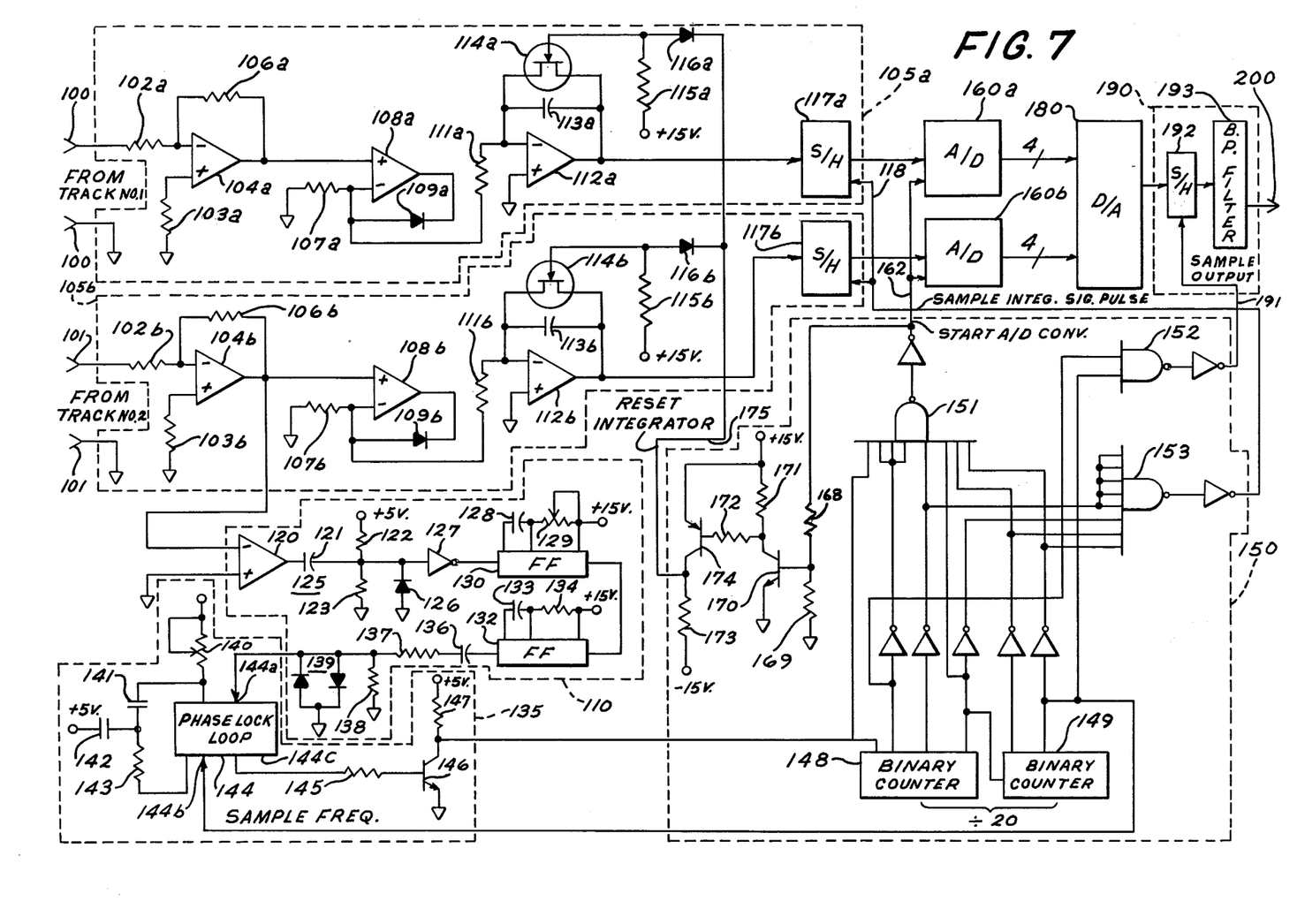
Figure 8:
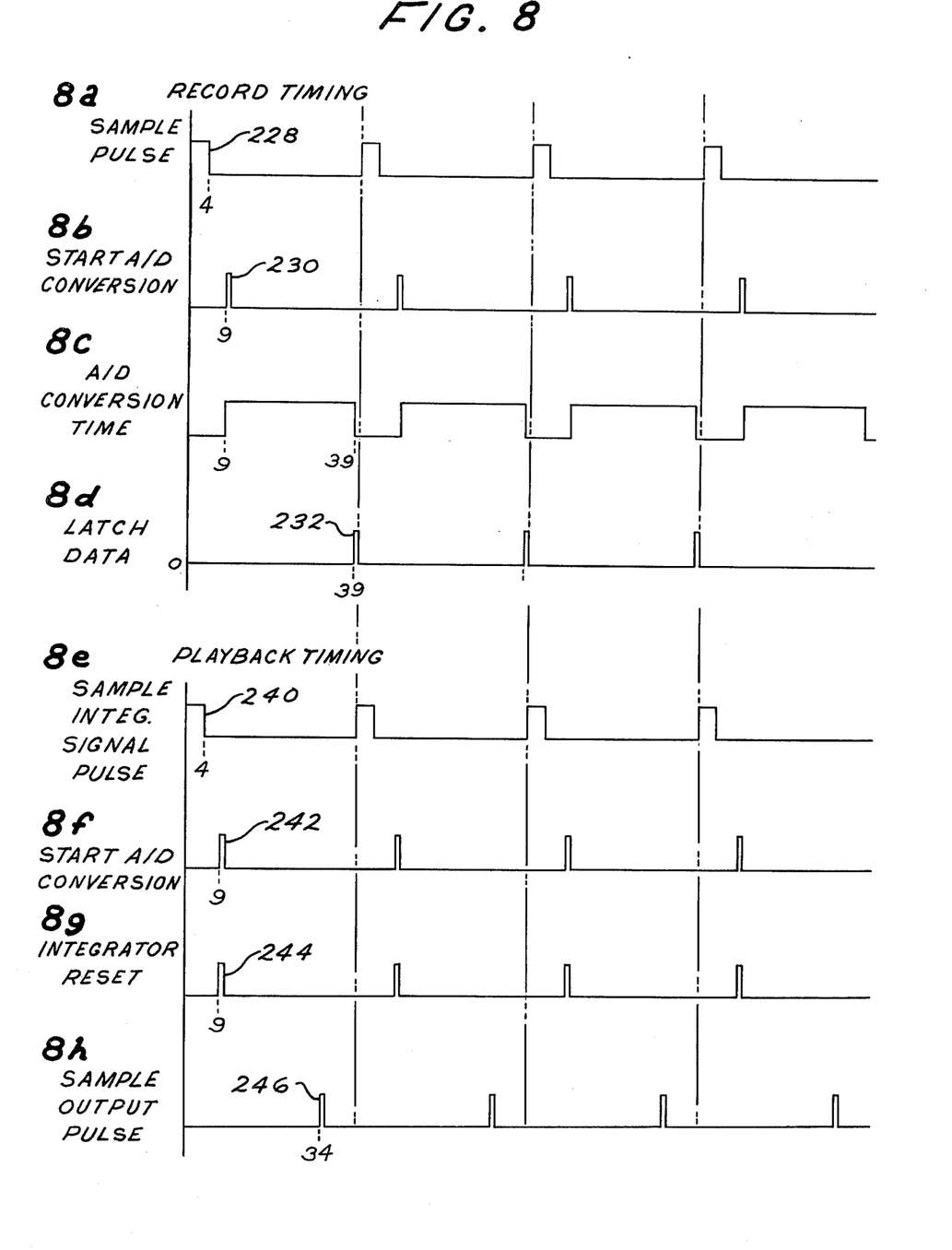
FIGS. 8a–8h show a series a timing pulses used in the embodiment of FIGS. 6 and 7.
Figure 9:
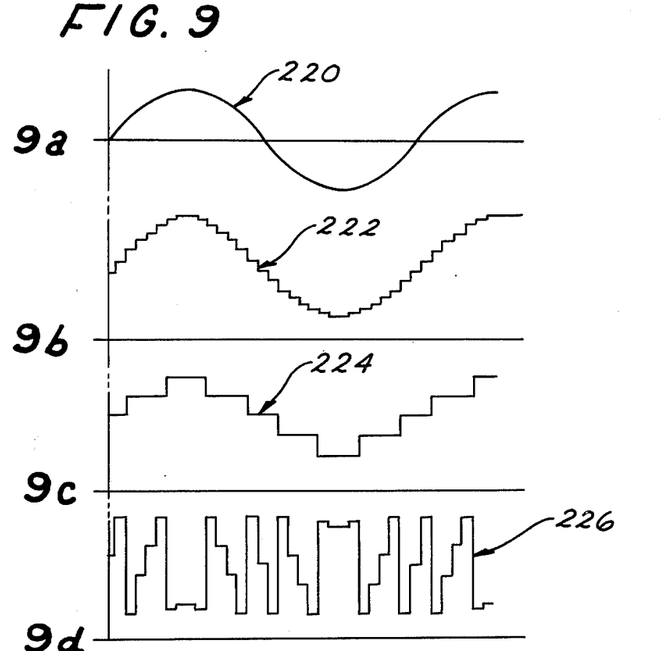
FIGS. 9a–9d show signal waveforms useful in explaining the operation of the FIG. 6 embodiment of the invention.

In FIGS. 6 and 7, a specific embodiment of the invention is shown in which certain components and circuits are the same as described in FIG. 5 and, therefore, carry the same reference numerals. Thus, in FIG. 6, an amplitude varying, audio frequency signal graphically shown by waveform 220 in FIG. 9a is supplied from input terminals 30 to sample-and-hold circuit 32. A sample timing pulse is provided from logic timing circuit 45 via line 33 to periodically sample the input signal at the basic sampling frequency of two times the highest audio frequency to be processed. At the output of circuit 32, there is provided a succession of discrete signal samples in the form of a stepped waveform 222 (FIG. 9b), the amplitude level of each sample being related to the amplitude of the input signal during the occurrence of the sampling pulse. The signal samples are applied to the input of analog-to-digital (A/D) converter circuit 34 which operates in conjunction with the "start convert" timing pulse from logic circuit 45 via line 35 to convert each signal sample into a composite digital word, the arithmetic value of which is determined by the amplitude level of the signal sample. In the preferred form of the invention, the output of A/D circuit 34 is in the form of a parallel binary digital signal in which a plurality of digital signal bit lines each of which represents an arithmetic value ranging from a most significant arithmetic bit value downward to a least significant arithmetic bit value in accordance with well known binary digital signal processing techniques. In the embodiment of FIG. 6, the signal sample amplitude level is converted into an eight bit digital word, commonly referred to as a byte, although either an increased signal range or a higher order of amplitude resolution can be achieved by increasing the number of digital bits in the A/D converter circuit 34, as previously explained.

In accordance with a feature of the invention, the composite eight bit word at the output of A/D circuit 34 is divided into a pair of sub-words of four bits each, such four bit sub-word commonly being referred to as a nibble. This is accomplished by coupling the first four, or higher order, bit lines designated MSSW to digital-to-analog (D/A) converter circuit 50a and the next four, or lower order, bit lines designated LSSW to D/A converter circuit 50b. It will be appreciated from FIG. 2 that the first four bit lines, MSSW, correspond to the most significant arithmetic values 16, 32, 64, 128 of the composite digital word and represent a first, coarse degree of resolution of the amplitude variations in the input signal. The second four bit lines, LSSW, correspond to the next lower or, in this case, least significant arithmetic values, 1, 2, 4, 8, of the composite digital word and, as such, bit lines LSSW represent a second, finer degree of resolution of the amplitude variations of the input signal that occur intermediate the coarse signal amplitude level variations represented by the most significant bits. Digital-to-analog converter circuits 50a and 50b operate in conjunction with a latch data timing pulse provided from logic circuit 45 via lines 37a, 37b to convert the inputted digital sub-words into a pair of analog signals graphically illustrated as waveforms 224 and 226, respectively, in FIGS. 9b, 9c. It will be appreciated that, having divided the digital arithmetic composite word developed in A/D circuit 34 into separate sub-words and having then applied the sub-words to separate D/A converter circuits 50a, 50b, the dynamic analog signal range on each of output lines MSSW and LSSW can then be arranged to be the same, or at least comparable even though an incremental change in amplitude level at the output of D/A circuit 50b corresponds to a much smaller change in the actual amplitude of the original analog input signal at input terminals 30 than does an incremental change in amplitude at the output of D/A circuit 50a.

The analog signals from circuits 50a and 50b are applied to modulator output stages 80a and 80b to render them suitable for recording on magnetic recording media. To this end, the output of D/A circuit 50a is fed through an operational amplifier 52a to a modulator circuit including field effect transistor (FET) 53a and comparator circuit 60a for the purpose of converting the stepped variations of signal waveform 224 at the output of D/A circuit 50a into a chopped or modulated high frequency suitable for recording in analog form on one track of a conventional audio frequency tape recorder. In a similar manner, the output signal from D/A converter circuit 50b is fed through operational amplifier 52b to a modulator circuit including FET 53b and comparator circuit 60b for conversion into a modulated high frequency signal to be recorded in analog manner on a second track of the tape recorder. A chop timing signal for this purpose is applied to a chop wave generator 65 via lines 79a and 79b to the gating terminals of FET's 53a and 53b to effect the chopping or conversion operation in known manner.

Timing for the signal conversion and chop modulating functions of FIG. 6 will be described with joint reference to FIGS. 8a–8d. Timing is provided in the recording section of FIG. 6 by means of a timing control logic circuit 45 whose fundamental timing is controlled by clock generator circuit 40, the basic frequency of which is determined by a crystal 41. In an actually constructed embodiment of the invention, a readily available color burst frequency crystal operating at 3.579545 MHz was employed although any suitable crystal frequency can be chosen provided suitable count down ratios are used to achieve the desired sampling frequency. The output of the crystal oscillator is amplified and applied via a divide-by-sixteen binary counter 44 to the input of a divide-by-40 binary counter arrangement including binary counter circuits 46 and 47 in timing logic circuit 45. In this way the approximately 223.7 kiloherz pulse train derived by dividing the crystal frequency by sixteen is converted by the divide-by-forty operation of binary counter 46 and 47 to a basic sampling frequency of about 5.6 kiloherz which corresponds to a repetition period of 176 microseconds. Consequently, the repetition period of each of the timing pulses is about 4.4 microseconds. The binary outputs of circuits 46 and 47 are interconnected as shown through NAND circuits 48, 49 and 51 to give the appropriate timing pulses 228, 230 and 232, of FIGS. 8a, 8b and 8d, to sample-and-hold circuit 32 and converter circuits 34, 50a and 50b. Specifically, counters 46 and 47 are connected to NAND circuit 48 such that an output sampling pulse 228 with a duration of four counts, or 17.6 microseconds, is generated on line 33 at the beginning of the sample period to initiate the sampling of the input signal amplitude. When the binary count of counters 46, 47 reaches a count of nine, a single start convert pulse 230 is sent from NAND circuit 49 via line 35 to A/D circuit 34 to convert the analog input signal to a composite binary digitial word output during timing periods 9–38. At the end of the sample period during count period 39, a latch data timing pulse is sent via lines 37a and 37b to D/A circuits 50a and 50b to initiate conversion of the sub-words into analog signals as previously described. Additionally, the timing signal at the output of NAND 51 is applied to one input terminal 62 of a one-shot multivibrator or flip-flop 62 to cause a square wave to be formed in known manner, at output terminal 62b, the repetition period of which is equal to the repetition period of the sampling pulse applied to S/H circuit 32. The chop wave at output terminal 62b is amplified in amplifier circuits including transistors 70 and 72 to a suitable level for controlling the triggering of FET's 53a and 53b.

Considering now the playback section of the system shown in FIG. 7, the amplitude modulated signals are supplied from the separate recording tracks of the tape recorder via input terminals 100 and 101 to the inputs of buffer amplifiers 104a and 104b. The amplified wave is then applied to the half wave rectifier circuits comprised of operational amplifiers 108a, 108b and diodes 109a, 109b for removal of the positive half of the modulated signal waveforms. The individual pulses of the resultant modulated trains of negative going pulses are the integrated as described in more detail subsequently in integrator circuits including operational amplifiers 112a, 112b, capacitors 113a, 113b and field effect transistors 114a, 114b. The integrated pulses are then applied to the inputs of sample-and-hold circuits 117a, 117b which operate in conjunction with a sample timing pulse from line 118 to provide signal samples to analog-to-digital converter circuits 160a, 160b. Converter circuits 160a, 160b operate in conjunction with the start conversion timing pulse on line 162 to convert the signal samples into a pair of 4-bit digital sub-words which correspond to the related separate MSSW and LSSW sub-words provided to the inputs of the digital-to-analog converter circuits 50a and 50b of the recording section of the system shown in FIG. 6. Having derived the digital sub-words of the analog signals supplied from the separate analog recording tracks, it is now possible to recombine the sub-words into a composite digital word format at the input of D/A converter 180 wherein the arithmetic value of the composite digital word is now representative of the amplitude of the signal sample as it appeared at the output of the sample-and-hold circuit 32 of the recording section of FIG. 6. This composite digital word is converted in D/A converter circuit 180 into analog form and fed to sample-and-hold circuit 192 which operates in conjunction with sample output timing pulses on line 191 to derive a stepped analog signal similar to waveform 222 of FIG. 9b and corresponding to the sampled analog signal appearing at the output of sample-and-hold circuit 32 in the recording section of FIG. 6. The output of S/H circuit 192 is then filtered through an appropriate band-pass filter 193 which serves to convert the successive sample amplitude levels into a continuous analog signal which is a reproduction of the audio frequency analog input signal originally supplied to terminals 30 of the FIG. 6 system recording section which can then be applied through conventional amplifier circuits to a transducer, such as a loudspeaker, for audio reproduction, all in known manner.

In the playback section, sampling and subsequent processing of the signals received from the magnetic tape recorder must be performed in proper synchronism with the sampling and signal processing performed in the record section of the system in order to achieve proper fidelity of signal reproduction. It is well known in digital recorders to record a synchronizing signal from the timing circuit of the recording section onto a separate track of the recording, the synchronizing signal being read from the tape and used for synchronizing the playback section. Such an arrangement can be used in the present invention also. However, in the FIG. 7 embodiment, synchronization of the playback section is achieved without the need for a separate timing signal track on the recorder. In this arrangement, the input modulated signal from one of the recorder tracks is used for this timing function since the signal itself carries the basic sampling frequency information. In the illustrated embodiment, the signal from the track corresponding to the least significant sub-word is used for this purpose since it is thought to be most likely to give accurate recovery of the desired timing data. However, any signal track may be used and in fact all signal tracks can be coupled through an OR circuit so that, should a momentary lapse of signal occur in one channel, another channel will continue to furnish the synchronizing information. Thus, in FIG. 7, the modulated signal reproduced from track No. 2 and appearing at the output of amplifier 104b is applied through amplifier 120, differentiator circuit 125 and clamp-inverter circuit 126, 127 to provide a series of negative spike pulses to the input of one-shot multivibrator or flip-flop circuit 130. The timing of the trailing edge or negative going output of flip-flop 130 is set by adjustable RC network 128, 129 so as to trigger the following flip-flop circuit 132 to achieve proper phasing of the timing pulses developed in the timing logic circuit 150. A conventional phase lock loop circuit 144 is furnished at one input 144a with the square wave output of flip-flop circuit 132 while another input 144b is provided with the pulse train from the output stage of binary counter 149. As is known in the art, a phase lock loop is essentially a phase-controlled, free running oscillator operating at a desired frequency set by the RC network of potentiometer 140 and capacitor 141. In this case, a frequency of twenty times the basic sampling frequency is employed which is applied from output 144c through amplifier circuit of transistor 146 to the input of binary counter 148 in timing logic circuit 150. Binary counters 148 and 149 are interconnected in known manner to provide a binary countdown of 20 since the timing pulse train from the phase lock loop is coupled as a matter of convenience to the output of the first binary stage of counter 148 instead of to its input. The binary output stages are interconnected as shown through NAND circuits 151, 152 and 153 to provide the previously mentioned timing pulses to sample-and-hold circuits 117a, 117b, analog-to-digital converter circuits 160a, 160b and to sample-and-hold circuit 192. More specifically, and with reference to FIGS. 8e-8h, a sample integrated signal pulse 240 is produced at the output of NAND circuit 153 during the initial time periods 0-3 of the timing interval and is applied to sample-and-hold circuits 117a, 117b via line 118. A start A/D conversion pulse 242 is generated at time period 9 and is applied to A/D circuits 160a, 160b. As explained in more detail subsequently, this same pulse is applied as an integrator reset pulse 244 to the gating terminal of FET's 114a, 114b via line 175 after amplification in the amplifier circuits of transistors 170 and 174. A/D conversion in circuits 160a, 160b is performed during time periods 9-33, at the conclusion of which a sample output pulse 246 is provided from NAND circuit 152 at time period 34 to the input of sample-and-hold circuit 192 via line 191.

Figure 10:
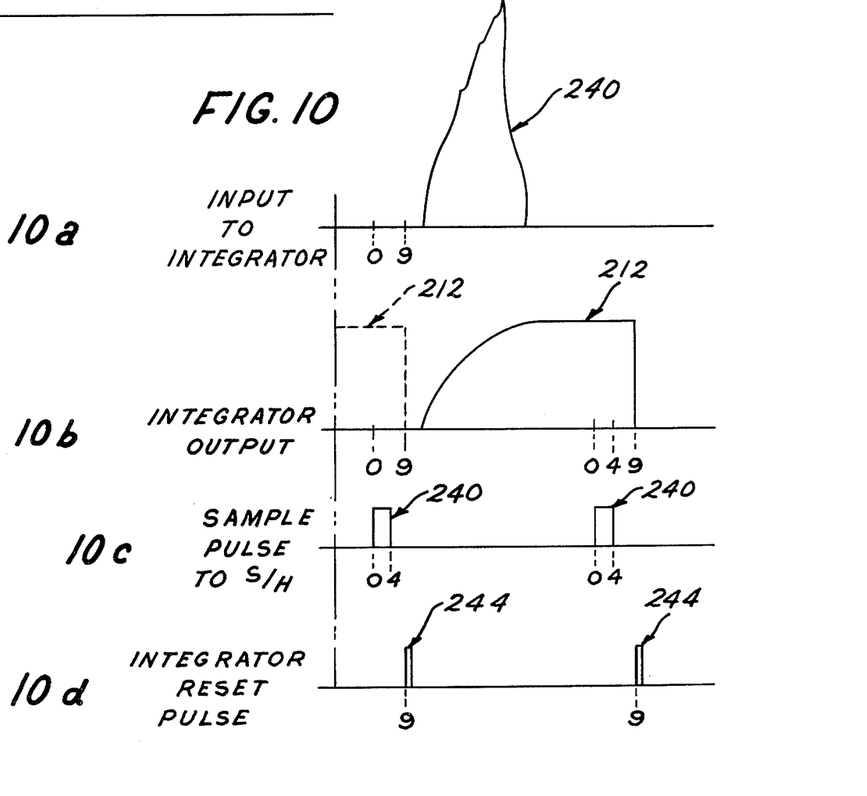
FIGS. 10a–10d show a series of signal waveforms and timing pulses useful in explaining the operation of the FIG. 7 embodiment of the invention.

In FIG. 10, there is shown the timing diagram of the integrator circuit operation and the initial sampling in S/H circuit 117a of amplitude level reproducing circuit 105a. It will be understood that during the integration period FET 114a is initially off, i.e. non-conducting, having been reset by reset pulse 244 at the conclusion of a previous integration cycle. When FET 114a is off, capacitor 113a can be charged by the next input pulse 210 from the half wave rectified signal at the input to comparator 112. Capacitor 113a and comparator 112a serve to integrate the pulse voltage, represented by the area under the pulse wave form 210. The use of an integrator is preferred to peak detection since it is less sensitive to noise and other perturbations in the pulse waveform that would adversely affect the accuracy achieved with peak detection. When the input pulse 210 returns to the zero baseline, no further increase occurs in the charge on capacitor 113a and the existing charge is held until a reset pulse 244 is applied to the gate terminal of FET 114a at timing period 9 to discharge the capacitor through the FET. Just prior to this, during timing periods 0-3, a sample pulse 240 is applied to S/H circuit 117a via line 118 to cause the amplitude level of the integrated waveform to be applied to A/D circuit 160a for conversion to a digital sub-word, as previously described. At timing period 9, as seen in the timing diagram of FIG. 8, a start A/D conversion pulse 242 is applied from NAND 151 to A/D circuit 160a to initiate the conversion process. The same pulse is supplied as a reset pulse 244 through amplifier circuits of transistors 170 and 174 to reset FET 117a, thus enabling capacitor 113a to be charged by the next incoming pulse waveform.

By way of illustrative example and without any intention of being limited thereto, there follows a listing of component values useful in constructing an operating embodiment of the present invention:

Resistors

54a/b, 106a/b, 115a/b 100K ohm
57a/b 22K ohm
59a/b 13K ohm
58a/b, 61a/b, 71, 145, 172. 10K ohm
64 6.8K ohm
67, 68, 147, 168, 169 5K ohm
69, 171 1.5K ohm
73, 107a/b, 122, 173 4.7K ohm
102a/b, 103a/b 3.3K ohm
111a/b 15K ohm
123 390 ohm
134 2.7K ohm
137, 138, 143 1K ohm
Potentiometer 129 50K ohm (max.)
Potentiometer 63, 140 10K ohm (max.)

Capacitors 42 47 picofarad
66, 128, 133, 142 0.01 microfarad
43, 136 0.1 microfarad
113a/b 0.0056 microfarad
121, 141 0.001 microfarad Other Components Diodes (all) 1N4148
S/H 32, 117a/b, 192 AD 582
Inverters—Circuit 40 4049
Inverters—all others 7404
NAND (all) 7430
A/D 34 574 (12 bit)
A/D 160a/b 7574 (8 bit)
D/A 50a/b AD 558 (8 bit)
D/A 180 DAC 80 CBI-V (12 bit)

Flip-Flop 62, 130, 132 74121
Oper. Ampls. (all) TL-081
FET 53a/b, 114a/b 2N4856
Binary Counters (all) 7493
Phase Lock Loop NE 565
Crystal 3.579545 MHz
Transistors 70, 146, 170 2N2222
Transistors 72, 174 2N2907

It will be appreciated that what has been described is a comparatively simple and inexpensive recording/playback system useful as a high quality professional multiple channel studio recorder for audio frequency signals as compared with pure digital recorders. The system of the invention advantageously employs digital signal processing techniques to achieve improvement in signal-to-noise ratio performance over systems using analog recording on the magnetic medium. Yet the use of analog recording on the magnetic medium as taught by this invention avoids the complexity and disadvantages associated with pure digital recording and playback.

While in accordance with the patent statutes, there have been described what at present are believed to be preferred embodiments of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. A hybrid digital-analog signal recording/playback system comprising:
    a recording section having
        an input signal channel for supplying an analog input signal;
        means including a first signal sampling circuit for periodically sampling the amplitude level of the input signal;
        first analog-to-digital converting means for converting the amplitude level of each signal sample into a composite digital word having a predetermined number of bits;
        means for separating the bits of the composite word into a plurality of sub-words representative of progressively finer resolution of the amplitude level of the signal sample;
        and means including first digital-to-analog converter circuits for converting the sub-words into analog signal levels in modulated form suitable for analog recording on separate tracks of a signal recording medium;
    and a playback section having
        means for reproducing the recorded signals from the separate tracks of the recording medium;
        second analog to digital converting means for reconverting the amplitude levels of the reproduced signals into sub-words corresponding to the sub-words of the recording section;
        means for recombining the reconverted sub-words into a composite digital word corresponding to the composite digital word of the recording section;
        and means including a second digital-to-analog converter circuit for converting successive ones of the recombined composite digital words into a continuous analog signal corresponding to the analog input signal supplied at the input signal channel of the recording section.

2. The system of claim 1 in which the output of the first and second analog-to-digital converting means is a parallel binary digital word having binary bits of decreasing arithmetic significance.

3. The system of claim 2 in which at least two of the sub-words formed from the composite digital word at the output of the first digital-to-analog converter means consist of an equal number of binary bits in sequentially decreasing arithmetic order significance.

4. The system of claim 2 in which all of the sub-words formed from the composite digital word at the output of the first digital-to-analog converter means each consist of an equal number of binary bits in sequentially decreasing arithmetic order significance.

5. The system of claim 1 in which the dynamic range of analog signal levels in at least two of the recording tracks are the same.

6. The system of claim 1 in which the dynamic range of analog signal levels in all of the recording tracks are the same.

7. The system of claim 1 in which the frequency range of the analog input signal is in the audio frequency range and in which the first signal sampling circuit has an operating sampling frequency of twice the maximum desired audio frequency to be recorded.

8. The system of claim 7 in which the audio frequency range is approximately 30–20,000 Hz and the sampling frequency is 40 kiloherz.

9. The system of claim 1 in which the recorded signal reproducing means includes, for each track of recorded signal, (a) a half wave rectification circuit for converting the modulated track signal to a train of amplitude varying pulses and (b), means including a second signal sampling circuit, responsive to the rectified pulses for producing an analog signal, the amplitude of which is proportional to the amplitude of the rectified pulses.

10. The system of claim 9 in which the pulse responsive means further includes a pulse integrator circuit directly responsive to the output of the pulse rectification circuit to produce an analog signal proportional to the pulse amplitude and which is coupled to the input of the second signal sampling circuit.

11. A method of recording and playing back audio frequency signals comprising the steps of:
    supplying an amplitude varying, audio frequency input signal;
    periodically sampling the amplitude of the input signal;
    converting the signal sample into a parallel bit digital word, the arithmetic value of which is representative of the amplitude of the signal sample;
    segregating the digital word into a plurality of sub-words of progressively decreasing arithmetic significance corresponding to progressively finer resolution of the amplitude level of the signal sample;
    converting each sub-word into an analog signal level in suitable form for recording in analog form on separate tracks of a dynamic signal recording medium;
    reproducing the analog signals from the separate tracks of recording medium;
    reconverting the separate reproduced analog signals into parallel bit digital sub-words;
    recombining the reconverted sub-words into a composite word;

and converting successive ones of the recombined composite words into a continuous analog signal corresponding to the amplitude varying, audio frequency input signal.

12. A hybrid digital-analog signal processing system for a signal recording system comprising:

an input signal channel for supplying an analog input signal;

means including a first signal sampling circuit for periodically sampling the amplitude level of the input signal;

first analog-to-digital converting means for converting the amplitude level of each signal sample into a composite digital word having a predetermined number of bits;

means for separating the bits of the composite word into a plurality of sub-words representative of progressively finer resolution of the amplitude level of the signal sample;

and means including first digital-to-analog converter circuits for converting the sub-words into analog signal levels in modulated form suitable for analog recording on separate tracks of a signal recording medium.

13. A hybrid digital-analog playback signal processing system for a signal recording system comprising:

means for reproducing recorded analog signals from separate tracks of a signal recording medium in which the recorded analog signals are analog conversions of arithmetically encoded samples of an audio frequency analog signal, the analog signals in successive recorder tracks representing progressively finer resolution of the amplitude level of the original analog signal sample;

analog-to-digital converting means for converting the amplitude levels of the analog signals from the recorder tracks into arithmetically encoded digital sub-words;

means for combining the converted sub-words into a composite digital word;

and means including a digital-to-analog converter circuit for converting successive ones of the combined composite digital words into a continuous analog signal corresponding to the original audio frequency analog signal.

* * * * *